United States Patent
Tormasov et al.

(10) Patent No.: US 10,613,935 B2
(45) Date of Patent: Apr. 7, 2020

(54) SYSTEM AND METHOD FOR SUPPORTING INTEGRITY OF DATA STORAGE WITH ERASURE CODING

(71) Applicant: Acronis International GmbH, Schaffhausen (CH)

(72) Inventors: Alexander G. Tormasov, Moscow (RU); Stanislav S. Protasov, Moscow (RU); Serguei M. Beloussov, Costa Del Sol (SG); Mark Shmulevich, Moscow (RU)

(73) Assignee: Acronis International GmbH, Schaffhausen (CH)

( * ) Notice: Subject to any disclaimer, the term of this patent is extended or adjusted under 35 U.S.C. 154(b) by 121 days.

(21) Appl. No.: 15/883,214

(22) Filed: Jan. 30, 2018

(65) Prior Publication Data

US 2018/0217898 A1     Aug. 2, 2018

Related U.S. Application Data

(60) Provisional application No. 62/452,528, filed on Jan. 31, 2017.

(51) Int. Cl.
*G11C 29/00*     (2006.01)
*G06F 11/10*     (2006.01)
(Continued)

(52) U.S. Cl.
CPC .......... *G06F 11/1076* (2013.01); *G06F 3/064* (2013.01); *G06F 3/065* (2013.01); *G06F 3/067* (2013.01); *G06F 3/0619* (2013.01); *G06Q 20/10* (2013.01); *G06Q 20/387* (2013.01); *G06Q 20/42* (2013.01); *G06Q 30/0207* (2013.01);
(Continued)

(58) Field of Classification Search
CPC ...... G06Q 20/387; G06Q 20/42; G06Q 30/08; G06Q 20/10; G06Q 30/0207; H04L 67/1097; H03M 13/1515; H03M 13/3761; H03M 13/13; H03M 13/373; G06F 16/22; G06F 11/1092; G06F 3/0689; G06F 3/0683; G06F 2003/0692; G06F 11/1076; G06F 3/064; G06F 3/065; G06F 3/067; G06F 3/0619

See application file for complete search history.

(56) References Cited

U.S. PATENT DOCUMENTS 9,785,510 B1 * 10/2017 Madhavarapu ..... G06F 11/1446
2014/0279930 A1 * 9/2014 Gupta ................ G06F 11/1464
                                           707/683

(Continued)

*Primary Examiner* — Guerrier Merant
(74) *Attorney, Agent, or Firm* — Arent Fox LLP; Michael Fainberg

(57) ABSTRACT

A system and method is provided for supporting integrity of distributed data storage with erasure coding. An exemplary method includes receiving a request to create a backup or archive of electronic data using erasure coding, contacting storage nodes and providing an incentive mechanism to incentivize each of the storage nodes to support the distributed data storage, receiving confirmation from at least some of the storage nodes indicating an agreement to store data, generating K data blocks and M parity blocks from the electronic data using erasure coding, and allocating the K data blocks and the M parity blocks to the storage nodes that have agreed to store data.

23 Claims, 7 Drawing Sheets

(51) Int. Cl.
*G06F 3/06* (2006.01)
*G06Q 30/08* (2012.01)
*H04L 29/08* (2006.01)
*G06Q 20/10* (2012.01)
*G06Q 30/02* (2012.01)
*H03M 13/37* (2006.01)
*H03M 13/13* (2006.01)
*G06Q 20/38* (2012.01)
*G06Q 20/42* (2012.01)
*H03M 13/15* (2006.01)

(52) U.S. Cl.
CPC ............ *G06Q 30/08* (2013.01); *H03M 13/13* (2013.01); *H03M 13/373* (2013.01); *H03M 13/3761* (2013.01); *H04L 67/1097* (2013.01); *H03M 13/1515* (2013.01)

(56) References Cited

U.S. PATENT DOCUMENTS

| | | | | |
|---|---|---|---|---|
| 2015/0278243 | A1* | 10/2015 | Vincent | G06F 16/182 707/634 |
| 2015/0356005 | A1* | 12/2015 | Hayes | G06F 12/0238 711/102 |
| 2016/0062834 | A1* | 3/2016 | Benight | G06F 16/22 714/766 |
| 2017/0160982 | A1* | 6/2017 | Altman | G06F 3/0644 |

* cited by examiner

SYSTEM AND METHOD FOR SUPPORTING INTEGRITY OF DATA STORAGE WITH ERASURE CODING

CROSS-REFERENCE TO RELATED APPLICATIONS

The application claims priority to U.S. Provisional Patent Application No. 62/452,528 entitled "System And Method For Supporting Integrity Of Data Storage with Erasure Coding" which was filed on Jan. 31, 2017, the contents of which is incorporated herein by reference in its entirety.

TECHNICAL FIELD

The present disclosure generally relates to electronic data storage, and, more particularly, to a system and method for supporting integrity of data storage with erasure coding.

BACKGROUND

Distributed data-storage systems ("DSSs") are complex software solutions that operate over hardware infrastructures consisting of a large number of servers of various designations that are connected together by multiple communication channels. Existing DSSs are subject to various kinds of hardware failures, including total or partial switching off of the electrical supply, network failures that may result in the DSS being divided into separate unconnected segments, disk failures, and the like.

Conventionally, there are two main approaches to ensuring reliability of data storage in conditions of failure, based on the duplication of information and the spreading of data over different components of the distributed data-storage system. The first approach is data replication and the second approach is erasure coding.

In general, data replication is the storage of each block of data (i.e., file or object, depending on the architecture of the data-storage system) in several copies on different disks or different nodes of the system. As a result, replication makes it possible to ensure maximum efficiency of data access, including a significant increase in speed of read access to data frequently used by different clients. However, data replication can be very costly from the perspective of the amount of disk space needed to create the several copies of each block of data.

The more popular backup technique is erasure (or redundant) coding, which is based on the use of mathematical algorithms to generate n chunks (i.e., data fragments or "derivatives") of a block of data using compression techniques in such a way that any k chunks will be sufficient to recover the initial block of data. Each of the n chunks obtained should be written to a separate disk, and, preferably, to a separate server to ensure high availability of the data. The reliability of a scheme of noiseless coding with parameters n,k (i.e., an "(n,k) scheme") is comparable to the reliability with replication of data with n−k+1 copies of each data block.

The use of noiseless coding makes it possible to reduce considerably the overheads on data storage necessary for data replication—the redundancy of data storage (i.e., including the ratio of the volume of storable data to the volume of useful data) for an (n,k) scheme is equal to n/k (the size of a data chunk is approximately equal to $Size_{Block}/k$, where $Size_{Block}$ is the volume of the initial block of data). The most widely used error-correcting codes in modern software systems of data storage are Reed-Solomon codes and variations, such as Cauchy codes, for example.

In these fault tolerant storage systems, usually any data fragment is split into k+m chunks, where k are the data chunks and m is the number of chunks generated on the basis of data chunks. For the generation, the error-correcting codes, such as the Reed-Solomon codes, allow the system to avoid primitive data duplication, but provide a very reliable mechanism that helps to restore all data even if some disks or servers become damaged. For example, to restore any k data chunks, the system should store k+m chunks. If any m chunks are lost, the system can completely restore all the data with remaining k chunks and it does not matter if they are data chunks or generated chunks.

FIG. 1 illustrates a flow diagram of the data storage technique using a conventional erasure coding algorithm. As shown, K data blocks 20 (i.e., data blocks 11-15) can be created from data fragment 10 using different algorithms (for example, using Reed-Solomon code). Moreover, M parity blocks 30 (i.e., data blocks 16-17) can be generated on the basis of the initial data blocks K. In case the DSS suffers any loss of any data block K, data can be recovered using the number of parity blocks M. Moreover, the number of parity blocks M can be selected depending on the desired degree of redundancy of the storage.

While data storage using erasure coding algorithms can be quite efficient, any excess storage is still associated with significant costs to the distributed storage system. In particular, redundancy requires additional storage devices and data centers. Moreover, data centers are constantly faced with the lack of storage space because the volume of data always grows faster than the capacity of the data storage.

In addition, reliable fault-tolerant storage systems should preferably use distributed data storage in that different data blocks and parity blocks should be stored on different servers to reduce the chance of data loss in case on or more servers fails, for example. Accordingly, increasing the number of storage servers will necessarily improve storage reliability.

Thus, a system and method is needed to enable distributed storage systems and service providers to support the integrity of data storage by increasing the number of storage servers.

SUMMARY

Since the usual increase in capacity of storage is constantly faced with the typical constraints, such as technical, financial, and organizational constraints, the disclosed system and provides an incentive mechanism that increases the interest of third-party providers of computers and servers to store data thereon. As a result, the distributed storage service network is able to increase the number of storage nodes to an unlimited number of service providers and owners of storage systems to manage increased expectations and requests for degrees of data redundancy.

Thus, according to an exemplary aspect, a method is provided for supporting integrity of distributed data storage with erasure coding. In this aspect, the method includes receiving, by at least one server, a request to create a backup or archive of electronic data using erasure coding; contacting, by the at least one server, a plurality of storage nodes and providing an incentive mechanism to incentivize each of the storage nodes to support the distributed data storage; receiving, by the at least one server, confirmation from at least a portion of the plurality of storage nodes indicating an agreement to store data; generating, by the at least one server, a plurality of K data blocks and M parity blocks from the electronic data using erasure coding; and allocating, by the at least one server, the plurality of K data blocks and the M parity blocks to the portion of the plurality of storage nodes that have agreed to store data.

According to another aspect of the exemplary method, the incentive mechanism comprises an electronic agreement and the confirmation from the portion of the plurality of storage nodes includes an electronic execution of the agreement.

According to another aspect of the exemplary method, the electronic agreement specifies conditions for storing the plurality of K data blocks and M parity blocks on each of the plurality of storage nodes.

According to another aspect, the exemplary method includes verifying storage and integrity of the plurality of K data blocks and the M parity blocks stored on the portion of the plurality of storage nodes, respectively.

According to another aspect, the exemplary method includes issuing an electronic payment to each of the portion of the plurality of storage nodes upon verification of the storage and integrity of the plurality of K data blocks and the M parity blocks stored thereon, respectively.

According to exemplary aspect, a system is disclosed for supporting integrity of distributed data storage with erasure coding. In this aspect, the system includes at least one server having one or more processors configured to receive a request to create a backup or archive of electronic data using erasure coding, contact a plurality of storage nodes and providing an incentive mechanism to incentivize each of the storage nodes to support the distributed data storage, receive confirmation from at least a portion of the plurality of storage nodes indicating an agreement to store data, generate a plurality of K data blocks and M parity blocks from the electronic data using erasure coding, and allocate the plurality of K data blocks and the M parity blocks to the portion of the plurality of storage nodes that have agreed to store data.

According to another exemplary aspect the one or more processors is further configured to verify storage and integrity of the plurality of K data blocks and the M parity blocks stored on the portion of the plurality of storage nodes, respectively.

According to another exemplary aspect the one or more processors is further configured issue an electronic payment to each of the portion of the plurality of storage nodes upon verification of the storage and integrity of the plurality of K data blocks and the M parity blocks stored thereon, respectively.

The above simplified summary of example aspects serves to provide a basic understanding of the disclosure. This summary is not an extensive overview of all contemplated aspects, and is intended to neither identify key or critical elements of all aspects nor delineate the scope of any or all aspects of the disclosure. Its sole purpose is to present one or more aspects in a simplified form as a prelude to the more detailed description of the detailed description that follows. To the accomplishment of the foregoing, the one or more aspects of the disclosure include the features described and particularly pointed out in the claims.

BRIEF DESCRIPTION OF THE DRAWINGS

The accompanying drawings, which are incorporated into and constitute a part of this specification, illustrate one or more example aspects of the invention and, together with the detailed description, serve to explain their principles and implementations.

DETAILED DESCRIPTION

Figure 1:
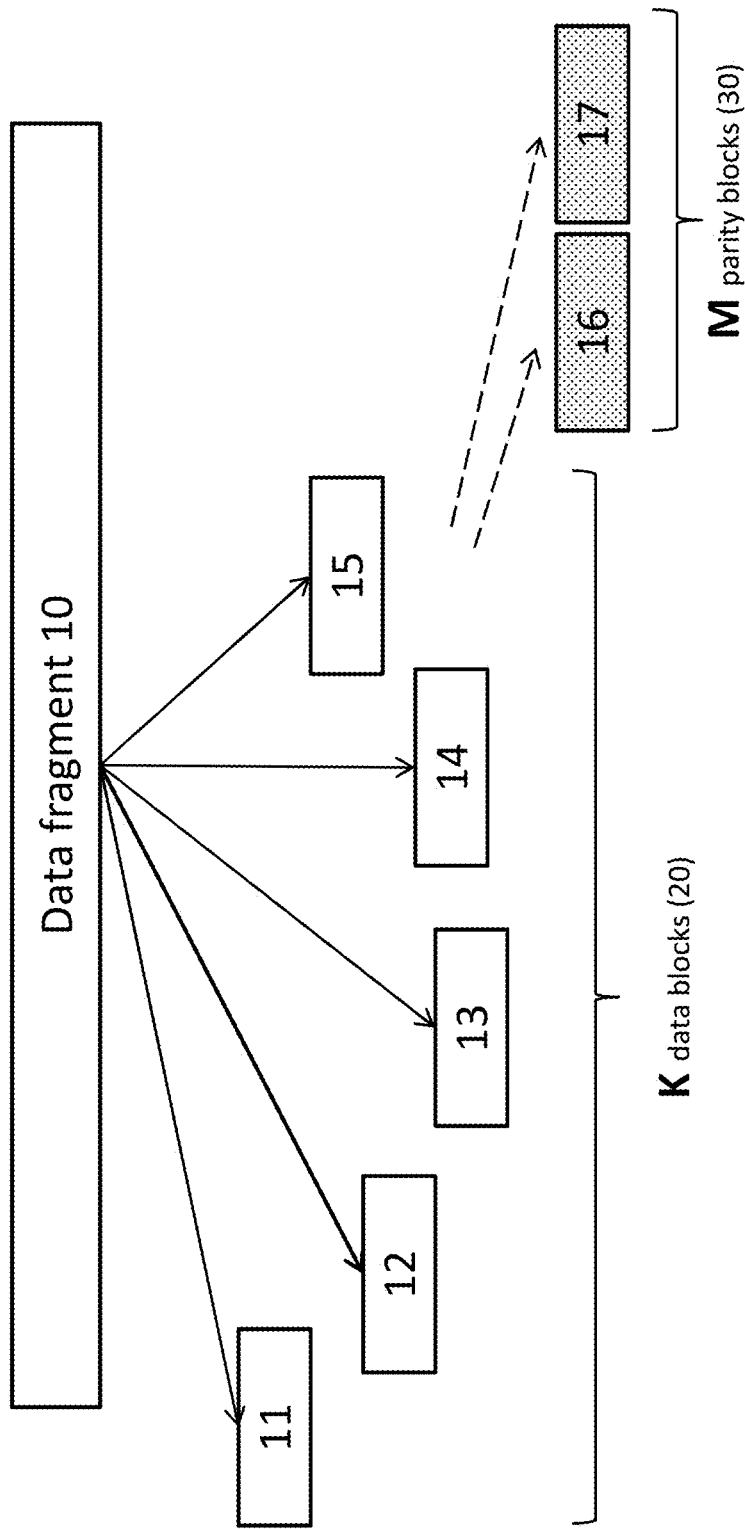
FIG. 1 illustrates a block diagram of the data storage technique using a conventional erasure coding algorithm.

Various aspects are now described with reference to the drawings, wherein like reference numerals are used to refer to like elements throughout. In the following description, for purposes of explanation, numerous specific details are set forth in order to promote a thorough understanding of one or more aspects. It may be evident in some or all instances, however, that any aspect described below can be practiced without adopting the specific design details described below. In other instances, well-known structures and devices are shown in block diagram form in order to facilitate description of one or more aspects. The following presents a simplified summary of one or more aspects in order to provide a basic understanding of the aspects. This summary is not an extensive overview of all contemplated aspects, and is not intended to identify key or critical elements of all aspects nor delineate the scope of any or all aspects.

Figure 2:
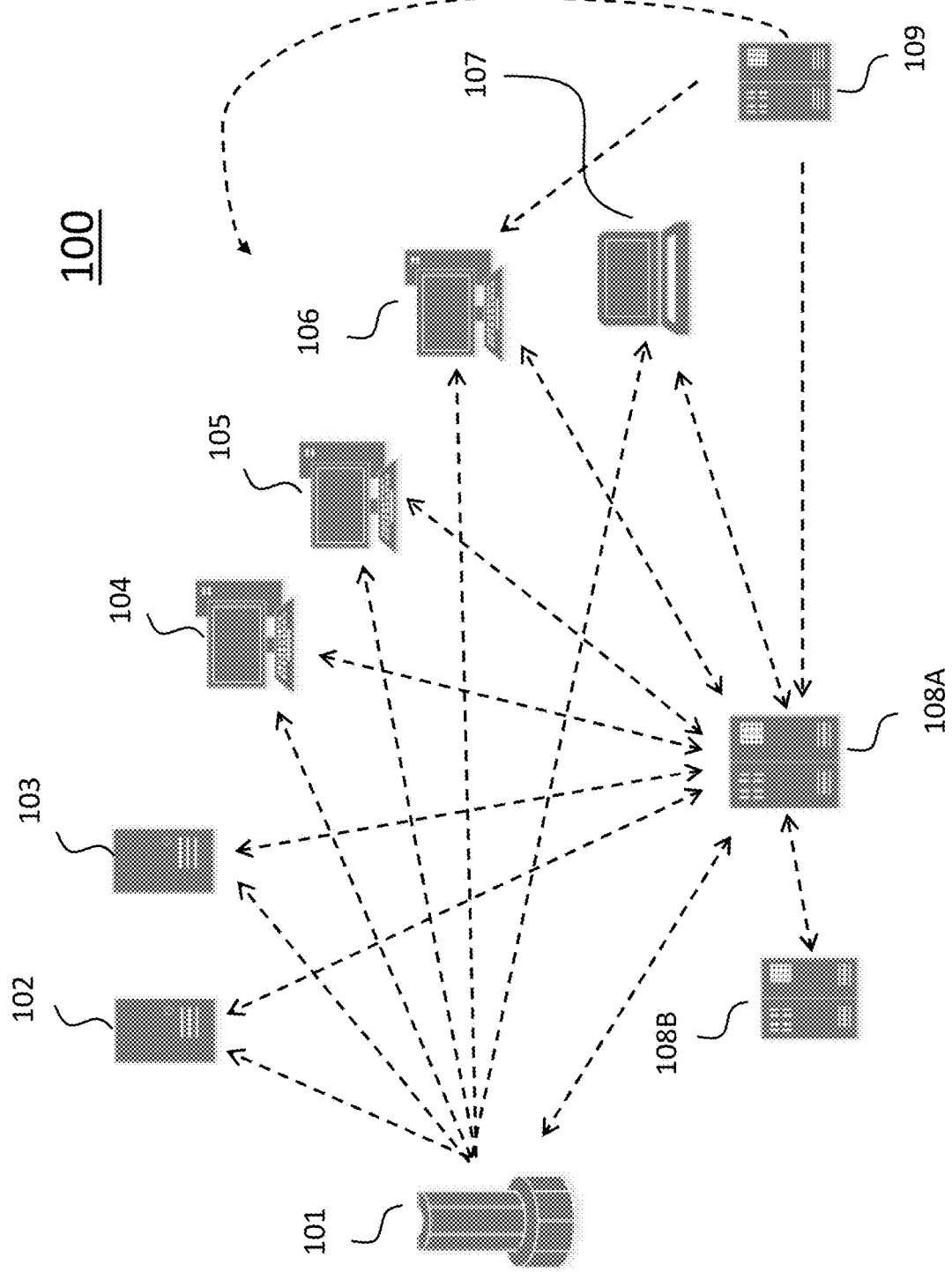
FIG. 2 illustrates a block diagram of a system for supporting integrity of data storage with erasure coding according to an exemplary aspect.

FIG. 2 illustrates a block diagram of a system 100 for supporting integrity of data storage with erasure coding according to an exemplary aspect. As shown, the system 100, which generally can be considered a distributed data storage system, includes a central storage management server 101 that is configured to perform the distribution of bulk data to the storage nodes of the system. In this aspect, the storage nodes can include storage servers 102 and 103, as well as other storage systems, such as personal computers 104, 105 and 106, and laptop 107. According to the exemplary aspect, the number of storage nodes should in no way be limited to the six nodes as shown and that preferably the system includes many separate storage nodes. Moreover, these storage nodes can be any type of specialized storage servers or personal computers and storage systems, such as the home network attached storage.

As will be described in detail below, the central storage management server 101 is configured to receive a request, from a client device, for example, to store a data fragment (e.g., one or more portions of a data file, one or more portions of a hard disk backup, etc.) and distribute K data blocks and M parity blocks of the data fragment to the storage nodes 102-107 (which in some aspects are all voluntary participants of the system 100, similar to torrent-based delivery systems, while in other aspects comprise some voluntary nodes, and other non-voluntary nodes) according to the erasure coding scheme. According to exemplary aspects, the number of data blocks K is greater than the number of parity blocks M. In some aspects, M is equal to 2 while in other aspects, M is equal to 3. In these aspects, there is a low probability that more than one storage node is lost at the same time, so two or three additional nodes with parity blocks is enough. However, in other aspects, greater than two or three parity blocks may be used. In addition, the system 100 further includes a verification service 108A, which can be a separate server, which is configured to check the performance of the storage conditions for each storage node 102-107. For example, in one exemplary aspect, the verification service 108A can periodically poll each storage node to confirm the operation of the hardware and/or software of the node as well as the integrity of the stored data blocks. Moreover, in an aspect, if the verification service 108A detects any operation errors with any of the storage nodes 102-107 or data integrity issues with any of the data blocks stored thereon, the verification service 108A is configured to transmit an error notification message to the central storage management server 101. In one aspect, the data blocks stored in each storage node 102-107 are encrypted prior to being transmitted to each node so that individual owners of the nodes (e.g., persons, companies, organizations, or the like) cannot access the data stored on their node. In one exemplary aspect, the verification service 108A may use hash sum, checksum, MD5 or the like for determination of operational errors or data integrity issues. In one example, the hashes of data blocks may be stored in a block-chain network and then the verification service 108A may compare the hashes of the blocks stored on a storage node with those stored into the block-chain. The central storage management server 101 may, after receiving the error notification message, create a new data block and/or parity block to ensure the system maintains the desired degree of redundancy for storage of the data, for example.

In one aspect, a particular schema for data redundancy comprises an "X+2" configuration, where a predefined number of servers (X) with K blocks (data blocks) are provided along with two (2) servers with M parity blocks. In some aspects, configurations may include "5+2", "14+2", "16+2", or the like. In these aspects, the assumption is that it is unlikely that several storage nodes will be lost or damaged simultaneously so it is more important to quickly restore the lost data from a server using data from other nodes, thus connection speeds being a critical limitation. In some aspects, there may be several hundred or thousands of nodes, so the schema for data redundancy may depend on the recovery time requested. With many independent storage nodes, any particular level of redundancy can be configured, but the "X+2" scheme generally prevents the concern of storage nodes not containing all the data blocks.

In addition, in one refinement of the exemplary aspect, the system 100 includes an additional verification service 108B, which can also be a server communicatively coupled to the verification service 108A. The additional verification service 108B can be configured to enhance the confidence of compliance storage conditions detected by the verification service 108A. In exemplary aspects, the verification service 108B is a second-level monitoring service, architecturally similar to verification service 108A but differ in ownership in order to maintain independent control between the two, thus strengthening verification.

Moreover, system 100 further includes an incentive service 109, which can be a computing system, a server or the like and is communicatively coupled to the storage nodes 102-107. Although incentive service 109 is shown as a separate component than central storage management server 101 in FIG. 2, it should be appreciated that in an alternative aspect the incentive service 109 can be offered as a service and/or be a sub component of central storage management server 101.

As described above, increasing the number of storage nodes in a distributed storage system will necessarily improve storage reliability for data storage using erasure coding. In this regard, incentive service 109 is configured to contact each storage node in the system 100, as well as other storage nodes (e.g., computing devices), and provide an incentive mechanism to these storage nodes to incentivize the node to agree to store one or more of the data blocks and/or parity blocks distributed by central storage management server 101. As a result, by incentivizing each storage node to effectively join the network and become a node within the distributed storage system 100, the disclosed system is enhancing the integrity of the data storage by distributing the data blocks and parity blocks across a larger network of storage nodes. If one or more of these nodes fails, becomes unavailable, or the like, the central storage management server 101 will still be more likely to recover the data chunks and fragment by accessing the data and/or parity blocks from the remaining operational storage nodes because new storage nodes have been incentivized to join the network and store data and parity blocks. In this aspect, having a larger quantity of storage nodes allows for more changes that a data block has remained intact and undamaged, increasing the recoverability of that data block. For example, if there are 14 storage nodes, as compared to only seven storage nodes, with four storage nodes being lost. With 14 nodes, all data is recoverable (if, for example, the 10+4 schema is used where there are 10 nodes for data blocks and 4 for parity blocks). For seven nodes (a 5+2 schema), only three nodes remain undamaged but at least five are needed to recover all data. Thus recoverability increases as the number of nodes increases.

Figure 3:
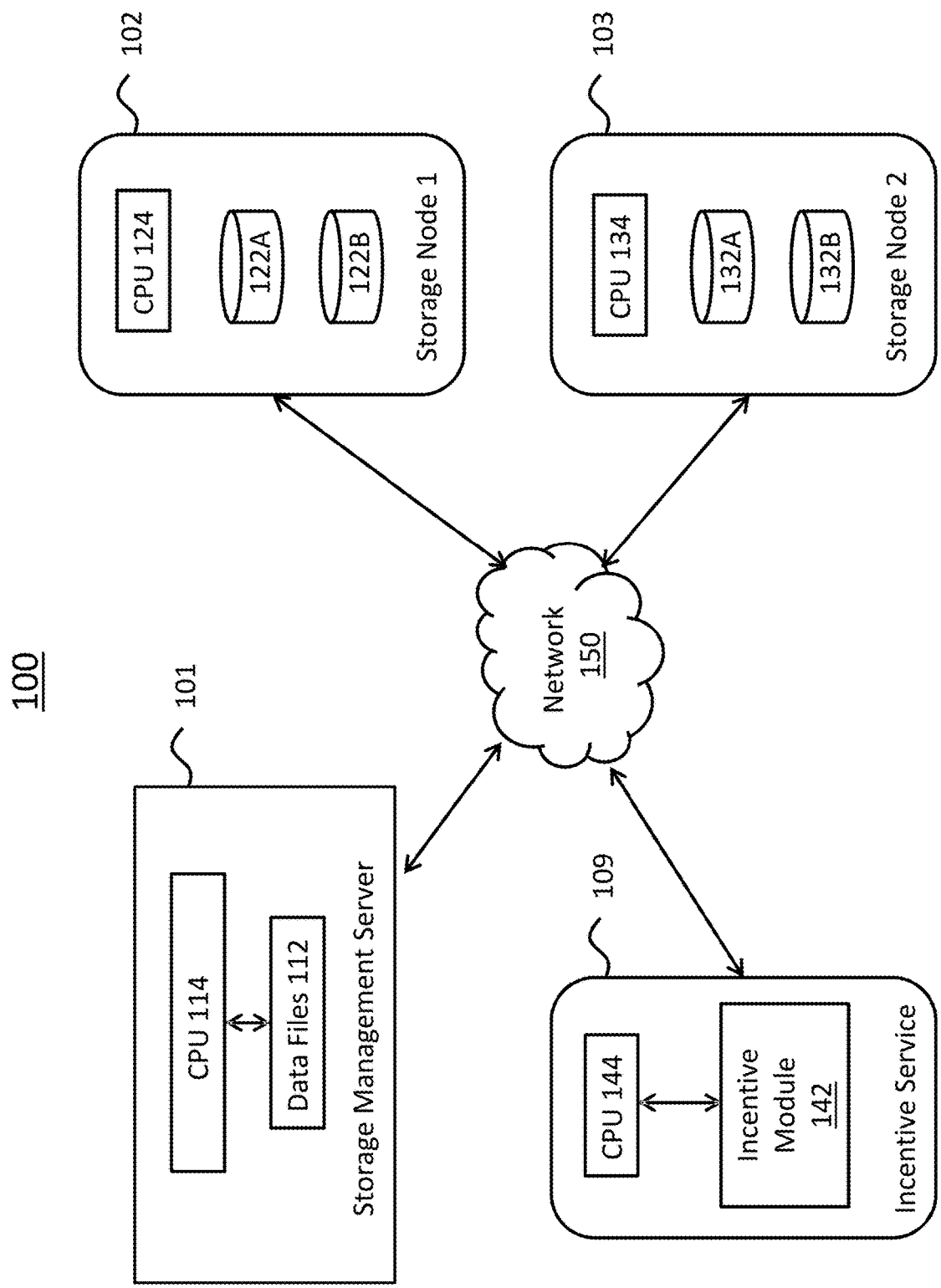
FIG. 3 illustrates a more detailed block diagram of the system for supporting integrity of data storage with erasure coding according to an exemplary aspect.

FIG. 3 illustrates a more detailed block diagram of the system 100 for supporting integrity of data storage with erasure coding according to an exemplary aspect. As shown, FIG. 3 illustrates a more detailed view of certain components described above with respect to FIG. 2. These components include storage management server 101, two of the storage nodes 102 and 103 and incentive service 109. It should be appreciated that the other components described above can be included in the system shown in FIG. 3, but may be omitted from the figure for purposes of clarity.

According to an exemplary aspect, the storage management server 101 is configured to manage the distributed data-storage of the data stored on a plurality of storage nodes (e.g., storage nodes 102 and 103). As shown, the storage management server 101 includes one or a plurality of data files 112 in electronic memory and a computer-processing unit ("CPU") 114. Other common components (e.g., network interfaces and the like) are included in the storage management server 101, but have not been shown herein so as to not unnecessarily obscure the aspects of the exemplary system and method. Moreover, it should be appreciated that while the exemplary aspect is described as being implemented on single storage management server 101, the system and method can also be implemented on multiple computers according to an alternative aspect. Thus, for the purpose of high availability, the system 100 can include several computers with such services deployed and services have a consensus protocol to communicate and agree on each other action. In one aspect, the consensus protocol can be implemented by a technical solution such as regular network protocols, XML, program scripts, smart contracts or the like. According to the exemplary aspect, the storage management server 101 can store one or more blocks of data from data files 112 in the system using the (n,k) scheme described above by distributing chunks, i.e., "derivatives", of the data across the disks of the storage nodes, i.e., nodes 102 and 103. It should be appreciated that the derivatives are fragments of the original block of data received from a client device, corporate entity, and the like, that has accessed the distributed storage service to obtain data backup of the files 112.

Moreover, as generally shown, each of the storage nodes 102 and 103 also comprises CPUs and a plurality of nodes and/or disks for data storage. For example, storage node 102 includes disks 122A and 122B and CPU 124 and storage node 103 includes disks 132A and 132B and CPU 134. It should be appreciated that two storage nodes and two disks per node is shown according to the illustrated aspect, but that the exemplary aspect is in no way intended to be limited by this number of servers and/or disks as describe above.

According to the exemplary aspect, the CPUs 114, 124 and 134 of storage management server 101 and storage nodes 102 and 103 (as well as CPU 144 of incentive service 109 discussed below) are configured to execute software code (e.g., processor executable instructions) stored in memory, the software code being configured to execute/facilitate the algorithms described herein for distributed data storage and management. In this aspect, storage management server 101, storage nodes 102 and 103 and incentive service 109 components form a DSS network that is capable of partitioning the storage between storage nodes 102 and 103.

Furthermore, according to the exemplary aspect, each of the components shown in FIG. 3 is configured to communicate with each other component of network 150. In an exemplary aspect, network 150 can be any network for communicating data and data operations and can include a communication system (not shown) that connects the various computers of the system by wire, cable, fiber optic, and/or wireless links facilitated by various types of well-known network elements, such as hubs, switches, routers, and the like. Network 150 may employ various well-known protocols to communicate information amongst the network resources. In one aspect, the network 150 can be part of the Internet or intranet using various communications infrastructure such as Ethernet, WiFi and the like.

Furthermore, it is contemplated that each of the storage nodes 102 and 103 (and any other storage devices added to system 100) can generally include hardware and software components configured to manage various storage resources within the computing environment as will be described in more detail below. According to the exemplary aspect, each of the disks (e.g., 122A, 122B, 132A, and 132B) can be a typical data storage device (e.g., hard disk drives, optical drives, magnetic tape drives and/or the like). Thus, according to the exemplary aspect, the storage nodes 102 and 103 collectively form the distributed data storage network that is provided to facilitate temporary and/or permanent storage of computer data according to the (n,k) scheme. The computer data (e.g., data files 112) may be any type of electronic, digital data generated and/or stored by a computer. For example, the computer data can represent text data, executable program code, or any other type of digital data. It is further contemplated according to one aspect that the storage nodes 102 and 103 can be provided as forming an online/remote file storage service (e.g., a cloud computing service) in one aspect, but alternatively can be incorporated into a local area network or the like as should be appreciated to those skilled in the art.

For purposes of this disclosure, the storage management server 101 is configured to initially store data in the distributed storage system, and, in particular, across one or more of the storage nodes/disks. According to an exemplary aspect, the storage management server 101 can store a file F having a size S (i.e., an object of storage) as the consecutive order of binary storage units (e.g., bits, bytes, sectors, clusters, etc.). Applying the (n,k) scheme for distributed storage of file F, the system can initially store k chunks (also referred to as "derivatives") with m number of parity chunks that will be sufficient to recover the initial file F. Preferably, each of the k chunks should be written to a separate disk, and, preferably, to a separate storage node to ensure high availability and reliability of the data, although two or more derivatives can be stored in the same node and even all derivatives k can be stored on a single node.

Moreover, according to the exemplary aspect, incentive service 109 includes a CPU 144 and incentive module 142. Although not shown in detail in FIG. 3, the incentive service 109 includes electronic memory that stores executable code that is executed by the CPU 144 to execute one or a plurality of modules configured to perform the algorithms disclosed herein, including the incentive module 142. In general, the term "module" as used herein can refer to a software service or application executed on one or more computers, including real-world devices, components, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer. Accordingly, each module can be realized in a variety of suitable configurations, and should not be limited to any example implementation described herein.

Figure 4:
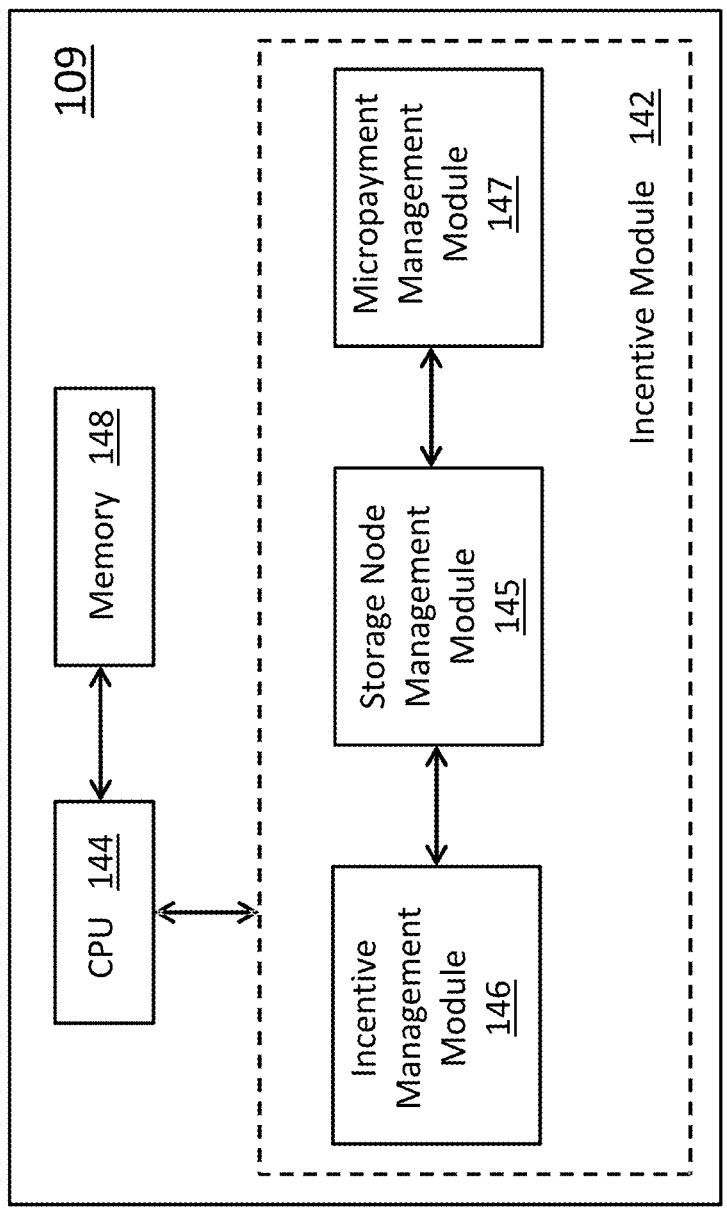
FIG. 4 illustrates a block diagram of the incentive service for supporting integrity of data storage with erasure coding according to an exemplary aspect.

The incentive service 109 provides incentives to various storage nodes to store data as shown in more detail in FIG. 4. FIG. 4 illustrates a block diagram of the incentive service for supporting integrity of data storage with erasure coding according to an exemplary aspect. It is noted that incentive service 109 can be a separate computing device, server, etc., as part of system 100, but can be a component of the storage management server 101 according to an alternative aspect. Thus, the incentive service 109 shown in FIG. 4 illustrates a more detailed view of the incentive service 109 of system 100 described above with respect to FIGS. 2-3. In the exemplary aspect, the incentive service 109 includes CPU 144 and electronic memory 148. Moreover, the incentive service 109 includes an incentive module 142 that is configured to perform the algorithms described below.

Specifically, the incentive service 109 can be composed of a plurality of modules, i.e., storage node management module 145, incentive management module 146 and micropayment management module 147. According to the exemplary aspect, the storage node management module 145 (which can actually be a component of storage management server 101 in an alternative aspect) receives an instruction from storage management server 101 that a volume of data has been requested (by a client device, for example) for backup or archiving among a plurality of storage nodes (e.g. storage nodes 102 and 103). In response, the storage node management module 145 is configured to identify existing and/or potential storage nodes that may be available for storage of K data blocks and M parity blocks of the data to be archived. For example, in one aspect, the incentive service 109 may store in memory 148 a listing of storage nodes that have previously stored data blocks.

Furthermore, once the list of potential targets for data storage have been identified by storage node management module 145, the incentive management module 146 is configured to generate an incentive request to be distributed to the target list of storage nodes. For example, the incentive management module 146 can be configured to contact each of the potential storage nodes and initiate an electronic auction to attract storage nodes to store one or more K data blocks and/or M parity blocks (or preferably a subset thereof). For example, in one aspect, if 100 storage nodes are required to support the desired degree of redundancy for storage of the data, the incentive management module 146 will send a request and accept the first 100 positive responses indicating an agreement (e.g., execution of a special smart contract) to store a data block on each of the 100 storage nodes. The incentive management module 146 will record the identity of each storage node (through an IP address, for example) and provide this information to storage node management module 145. In turn, the storage node management module 145 can provide the confirmation list of storage nodes that have agreed to store data blocks to storage management server 101. In another aspect, the incentive management module 146 may offer an auction at which the 100 storage nodes with the lowest bids for storage are awarded the storage contracts. In other aspects, the incentive management module 146 may implement any other useful commonly known incentivizing methods.

In the exemplary aspect, upon receiving the list of storage nodes, the storage management server 101 will break the data to be archived into data blocks (e.g., K blocks) and then add the parity blocks (e.g., M parity blocks) thereto, which are generated using erasure coding algorithms as described above. The storage management server 101 can then transmit each of these blocks and parity blocks to the contracted storage nodes. At that stage, the storage node management module 145 is configured to confirm that the data blocks and parity blocks have been correctly stored on the respective storage nodes as issued by the storage management server 101. Upon confirmation, the storage node management module 145 instructs the micropayment management module 147 to issue a micropayment according to the special smart contract to each verified storage node. For example, storage node management module 145 can be configured to execute an electronic transfer of the payment from a financial account associated with the storage management server 101 to an online account number identified by the storage node in the special smart contract. In this way, the incentive module 142 advantageously creates an incentive to encourage remote storage nodes to accept storage of blocks and parity blocks of the data. In this manner, the incentive service 109 is capable of supporting the desired degree of redundancy for storage of the data, as requested by the client device to the storage management server 101, for example.

Figure 5A:
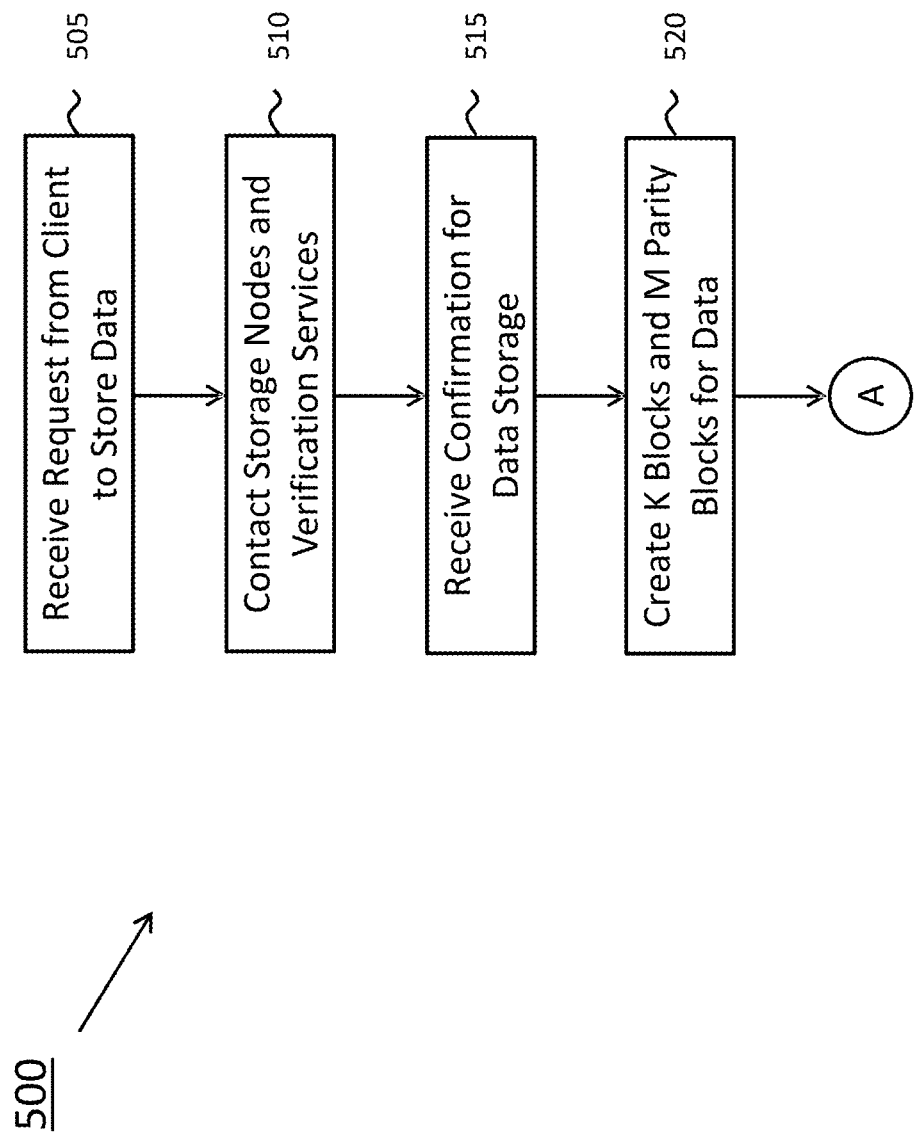
FIGS. 5A and 5B illustrate a flowchart of a method for supporting integrity of data storage with erasure coding according to an exemplary aspect.
Figure 5B:
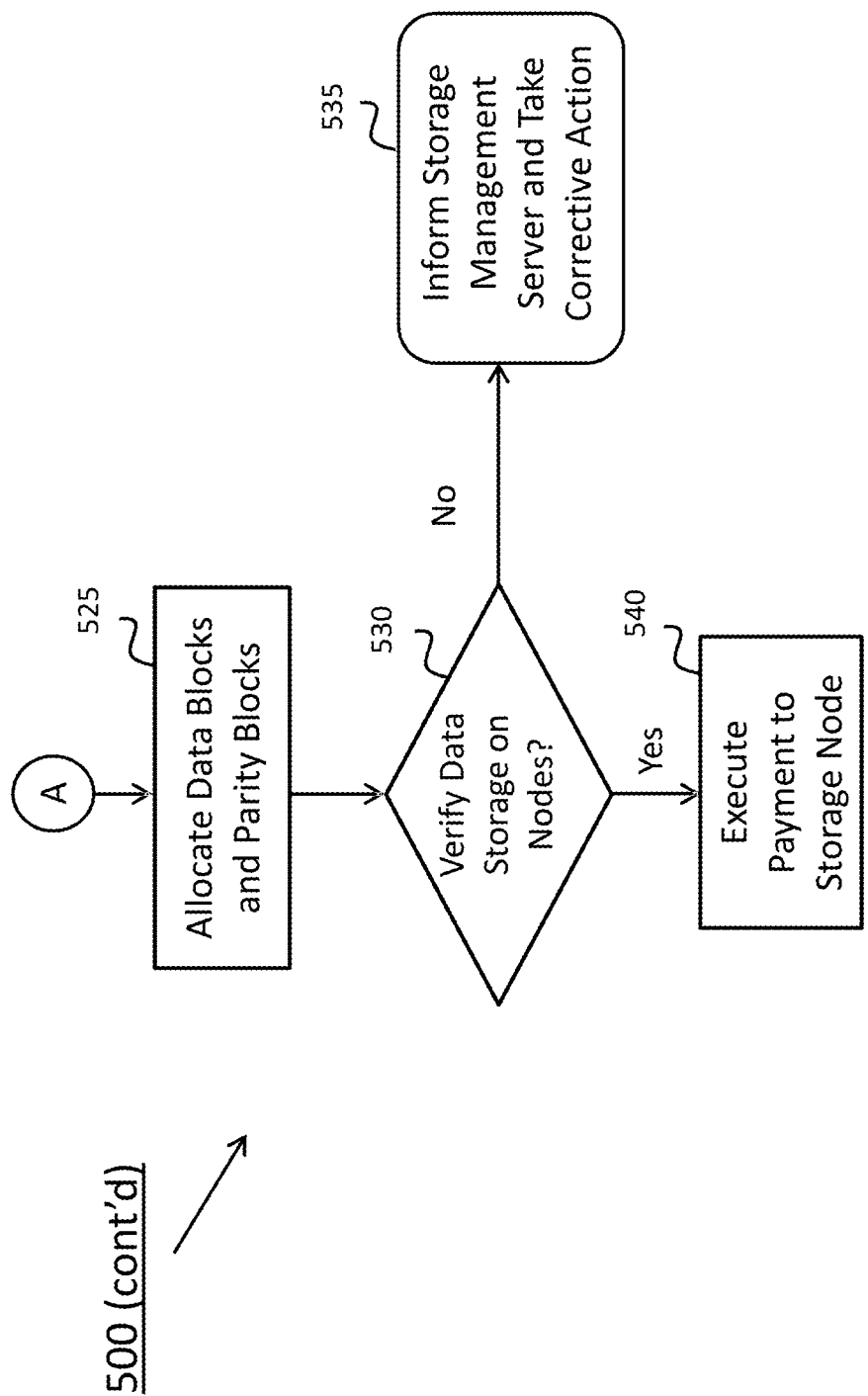

FIGS. 5A and 5B illustrate a flowchart of a method for supporting integrity of data storage with erasure coding according to an exemplary aspect. It should be understood that the following exemplary method utilizes the system 100 and components described above and makes reference to them as follows.

As shown, initially at step 505, the storage management server 101 receives from one or more users, such as client devices, some volume of data for backup or archiving. In one aspect, the backup request may include a specification regarding the degree of redundancy of the storage for the data backup/archive. Next, at step 510, the incentive service 109 contacts possible storage nodes (e.g., storage nodes 102-107) an issues an electronic auction, for example, for the nodes to encourage the nodes to accept storage terms for the data blocks and/or parity blocks. For example, the auction may include an electronic transmission of a special smart contracts the includes specified terms and conditions, including payment for agreement to store the data on the node. Moreover, although the exemplary aspect contemplates using micropayments as a mechanism for incentivizing storage nodes to store data, alternative incentives can be offered. For example, in one aspect, the incentive service 109 may offer services (e.g., separate data storage) in return for an agreement to store archived data on the storage node. Moreover, the auction can be offered both for data storage and to verification systems.

At step 515, the incentive service 109 receives confirmation, which may be in the form of an executed smart contract, from each participating storage node. Identification information for each participating storage node (e.g., IP address, and the like) is provided to the storage management server 101. At step 520, the storage management server 101 divides the data into K data blocks and adds M parity bits, which are generated using erasure coding algorithms, as described above. The data blocks and parity blocks are then distributed at step 525 from the storage management server 101 to the participating storage nodes (e.g., storage nodes 102-107) over network 150, for example, using the associated IP addresses. In exemplary embodiments, the electronic data to be stored is encrypted at the data block level prior to distribution to each storage node so that owners of the storage nodes may not access the distributed data blocks stored therein. The data blocks and parity blocks are then stored on storage means, such as storage disks 122A, 122B, 132A and 132B, accordingly. For example, in one aspect, the conditions of storage and data verification and payment conditions can be described in the special smart contracts executed by each storage node, including, for example, the specified number of data blocks stored thereon.

Next, the method proceeds to step 530 at which point service of verification can be performed by storage node management module 145 and/or separately by verification service 108A, for example. In an exemplary aspect, the verification is performed according to the smart contract, which can also be used to periodically check the integrity of the data stored on all the computers and servers involved in storage. In an exemplary aspect, testing can be executed in full test and selective access to the file/data block by downloading or copying the file/block from the particular storage node. Moreover, verification can be performed by the verification service 108A, for example, by verifying the hash sum of the data block and any other verification procedures as would be appreciated to one skilled in the art.

If the storage conditions according to the smart contract are fulfilled, the payments for the storage service are automatically executed by micropayment management module 147. In particular, the micropayment management module 147 can automatically send electronic micropayments to the owners of storage systems and/or the owners of the verification services according to the exemplary aspect at step 540. Alternatively, if the data storage cannot be verified at step 530 by incentive service 109 and/or verification service 108A, a notification will be sent by such service to the storage management server 101 indicating the failure of the storage of the particular block(s). In this instance, the storage management server 101 can then perform a corrective action, such as sending the particular block(s) (e.g., one of data blocks, parity blocks, or both) to the next one or more storage nodes in the distributed services system. According to some aspects of the invention, in the system 100 the storage nodes 102-107 are "voluntary" storage nodes which belong to different owners, users, companies and the like. Any of the storage nodes can have standard technical issues such as outages, maintenance, etc. Additionally, any of the storage nodes can stop participating in the storage project for any reason, known or unknown, without notification to the system 100. Accordingly, the system 100 ascertains when a storage node is no longer participating, or no longer operational, by receiving some sort of information—for example by testing storage to that node, or the like, using the verification service 108A. This information should be obtained as quickly as possible in order to continue proper operation of the system 100. Accordingly, efficient algorithms for verifications are used.

In addition to determining whether a particular storage node is no longer operational or participating, the system 100 is able to restore the unavailable portion of information (data blocks) as soon as possible by restoring the data from any similar data blocks or from parity blocks, where this information is stored as encoded and compressed. The system 100 provides an index (e. g. hash index or other descriptors) which contains a list of storage server addresses (storage node URLs or IP-addresses) and corresponding hashes/descriptors. With the index and hash information, the system 100 searches the same data blocks (or parity blocks) by hash/descriptor and moves or copies the data blocks to a vacant storage node. In one aspect, there may be a pool of spare nodes for emergency cases (e.g., nodes that are looking to participate in the distributed storage system). Therefore, the system 100 can learn which portions of data needs restoring when a storage node either withdraws participation, or has technical issues rendering the node unavailable.

Thus, according to the exemplary system and method, the incentive service 109 can be implemented to increase the number of storage nodes within a distributed storage service network. As a result, the K data blocks and M parity blocks can be selectively distributed across a broader spectrum of nodes in order to meet a desired degree of redundancy of the storage that can be requested by a client device, for example. Moreover, it should be appreciated that while the method describes the attempt by the incentive service 109 to obtain storage nodes as being in response from a request by the storage management server 101 to create a specific data backup or archive, the incentive service 109 can perform its algorithms independently of the data backup request. For example, the incentive service 109 can be configured to continuously or periodically issue auctions in an attempt to identify storage nodes for future data storage. In one aspect, the incentive service 109 may issue the auctions based on a desired degree of redundancy by a client device. As a result, the incentive service 109 is continually building a network of storage nodes with the distributed storage services network to ensure any levels of data redundancy can always be met.

Figure 6:
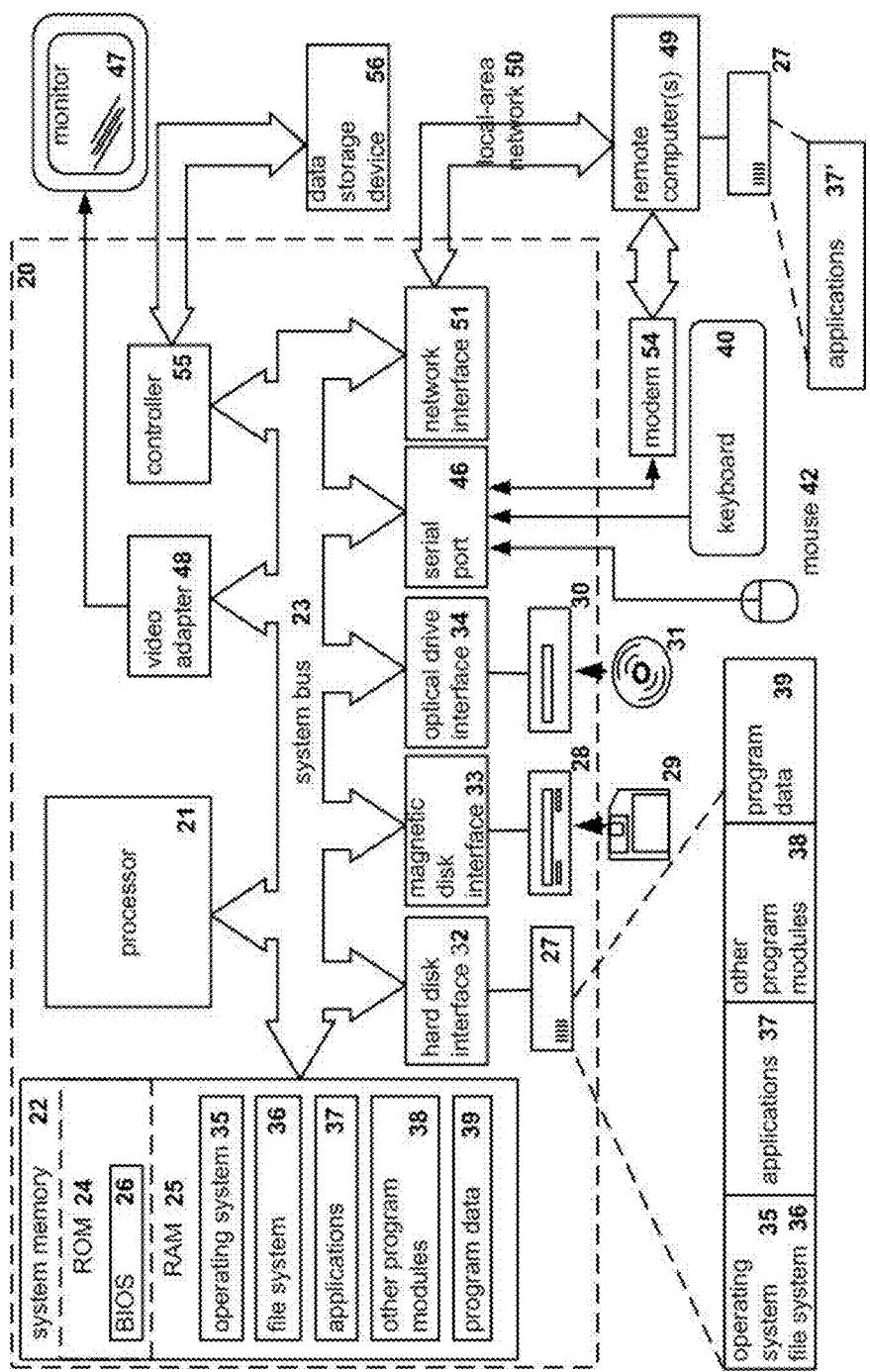
FIG. 6 illustrates a block diagram of an example of a general-purpose computer system (which can be a server) on which the disclosed system and method can be implemented according to an example aspect.

FIG. 6 illustrates a block diagram of an example of a general-purpose computer system (which can be a server) on which the disclosed system and method can be implemented according to an example aspect. In particular, FIG. 6 can illustrate an exemplary aspect of the storage management server 101 and/or the incentive service 109, for example. As shown, a general purpose computing device is provided in the form of a computer system 20 or the like including a processing unit 21, a system memory 22, and a system bus 23 that couples various system components including the system memory to the processing unit 21. It should be appreciated that the processing unit 21 can correspond to CPU 114 and/or CPU 144, and system memory 22 and/or file system 36 can correspond to the electron memory to store data files 112 or memory 148, for example.

Moreover, the system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the computer 104, such as during start-up, is stored in ROM 24.

The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 20 includes a file system 36 associated with or included within the operating system 35, one or more application programs 37, other program modules 38 and program data 39. A user may enter commands and information into the computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 20 may operate in a networked environment using logical connections to one or more remote computers 49. The remote computer (or computers) 49 may be another computer, a server, a router, a network PC, a peer device or other common network node, and typically includes many or all of the elements described above relative to the computer 20. The logical connections include a network interface 51 and connected to a local area network (i.e., LAN) 51, for example, and/or a wide area network (not shown). Such networking environments are commonplace in offices, enterprise-wide computer networks, Intranets and the Internet. It should be appreciated that remote computers 49 can correspond to one or more storage nodes, such as storage nodes 102-107, as described above.

When used in a LAN networking environment, the computer 20 is connected to the local network 51 through a network interface or adapter 53. When used in a WAN networking environment, the computer 20 typically includes a modem 54 or other means for establishing communications over the wide area network, such as the Internet.

The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed:

1. A method for supporting integrity of distributed data storage with erasure coding, the method comprising:
receiving, by at least one server, a request to create a backup or archive of electronic data using erasure coding;
contacting, by the at least one server, a plurality of storage nodes and providing a proposed electronic agreement comprising an incentive for each of the storage nodes to participate in distributed data storage, wherein participation in the distributed data storage comprises storing the electronic data;
receiving, by the at least one server, confirmation from at least a portion of the plurality of storage nodes indicating an agreement to store the electronic data;
generating, by the at least one server, a plurality of K data blocks and M parity blocks from the electronic data using erasure coding;
allocating, by the at least one server, the plurality of K data blocks and the M parity blocks to the portion of the plurality of storage nodes that have agreed to store data;
determining whether the allocation to the portion of the plurality of storage nodes is verified;
issuing the incentive to any storage node of the plurality of storage nodes whose allocation is verified; and
performing a corrective action when the allocation is not verified.

2. The method according to claim 1, wherein the confirmation from the portion of the plurality of storage nodes includes an electronic execution of the electronic agreement.

3. The method according to claim 2, wherein the electronic agreement specifies conditions for storing the plurality of K data blocks and M parity blocks on each of the plurality of storage nodes.

4. The method according to claim 1, wherein verifying allocation comprises verifying storage and integrity of the plurality of K data blocks and the M parity blocks stored on the portion of the plurality of storage nodes, respectively.

5. The method according to claim 4, wherein the incentive is an electronic payment.

6. The method of claim 5, further comprising:
issuing the electronic payment to an account associated with the portion of the plurality of storage nodes.

7. The method of claim 1, wherein the request comprises a desired degree of redundancy for storage of the electronic data.

8. The method of claim 7, wherein the corrective action comprises:
sending a particular block of the K data blocks and the M parity blocks to a next storage node in the plurality of storage nodes in order to increase the desired degree of redundancy.

9. The method of claim 1, further comprising:
generating an auction to another plurality of storage nodes to identify new storage nodes for future storage of the electronic data by:
receiving bids from the another plurality of storage nodes; and
identifying a first amount of the new storage nodes from the another plurality of storage nodes with a lowest bid value.

10. The method of claim 9, wherein identifying the first amount of the new storage nodes is performed based on a desired degree of redundancy for storage of the electronic data.

11. The method of claim 1, wherein the electronic data is encrypted prior to storage at a particular storage node.

12. A system for supporting integrity of distributed data storage with erasure coding, the system comprising:

at least one server having one or more processors configured to:
- receive a request to create a backup or archive of electronic data using erasure coding,
- contact a plurality of storage nodes and provide a proposed electronic agreement comprising an incentive for each of the storage nodes to participate in distributed data storage, wherein participating in the distributed data storage comprises storing the electronic data,
- receive confirmation from at least a portion of the plurality of storage nodes indicating an agreement to store the electronic data,
- generate a plurality of K data blocks and M parity blocks from the electronic data using erasure coding,
- allocate the plurality of K data blocks and the M parity blocks to the portion of the plurality of storage nodes that have agreed to store data,
- determine whether the allocation to the portion of the plurality of storage nodes is verified;
- issue the incentive to any storage node of the plurality of storage nodes whose allocation is verified; and
- perform a corrective action when the allocation is not verified.

13. The system according to claim 12, wherein the confirmation from the portion of the plurality of storage nodes includes an electronic execution of the electronic agreement.

14. The system according to claim 13 wherein the electronic agreement specifies conditions for storing the plurality of K data blocks and M parity blocks on each of the plurality of storage nodes.

15. The system according to claim 12, wherein the one or more processors is further configured to verify storage and integrity of the plurality of K data blocks and the M parity blocks stored on the portion of the plurality of storage nodes, respectively.

16. The system according to claim 15, wherein the one or more processors is further configured issue an electronic payment to each of the portion of the plurality of storage nodes upon verification of the storage and integrity of the plurality of K data blocks and the M parity blocks stored thereon, respectively.

17. The system of claim 12, wherein the electronic data is encrypted prior to storage at a particular storage node.

18. A non-transitory computer readable medium storing thereon computer executable instructions, that when executed by a processor, perform a method comprising:
- receiving, by at least one server, a request to create a backup or archive of electronic data using erasure coding;
- contacting, by the at least one server, a plurality of storage nodes and providing a proposed electronic agreement comprising an incentive for each of the storage nodes to participate in distributed data storage, wherein participating in the distributed data storage comprises storing the electronic data;
- receiving, by the at least one server, confirmation from at least a portion of the plurality of storage nodes indicating an agreement to store the electronic data;
- generating, by the at least one server, a plurality of K data blocks and M parity blocks from the electronic data using erasure coding;
- allocating, by the at least one server, the plurality of K data blocks and the M parity blocks to the portion of the plurality of storage nodes that have agreed to store data;
- determining whether the allocation to the portion of the plurality of storage nodes is verified;
- issuing the incentive to any storage node of the plurality of storage nodes whose allocation is verified; and
- performing a corrective action when the allocation is not verified.

19. The computer-readable medium according to claim 18, wherein the confirmation from the portion of the plurality of storage nodes includes an electronic execution of the electronic agreement.

20. The computer-readable medium according to claim 19, wherein the electronic agreement specifies conditions for storing the plurality of K data blocks and M parity blocks on each of the plurality of storage nodes.

21. The computer-readable medium according to claim 18, wherein verifying allocation comprises verifying storage and integrity of the plurality of K data blocks and the M parity blocks stored on the portion of the plurality of storage nodes, respectively.

22. The computer-readable medium according to claim 21, wherein the incentive is an electronic payment.

23. The computer-readable medium of claim 18, wherein the electronic data is encrypted prior to storage at a particular storage node.

* * * * *